United States Patent [19]

Chiklis

[11] 3,899,355

[45] Aug. 12, 1975

[54] BATTERY ASSEMBLY

[75] Inventor: Charles K. Chiklis, Lexington, Mass.

[73] Assignee: Polaroid Corporation, Cambridge, Mass.

[22] Filed: Feb. 14, 1974

[21] Appl. No.: 442,377

[52] U.S. Cl. ............................. 136/111; 136/111 X
[51] Int. Cl. .................................... H01m 21/00
[58] Field of Search ............ 136/111, 134, 108–110

[56] References Cited
UNITED STATES PATENTS

| | | | |
|---|---|---|---|
| 2,880,259 | 3/1959 | Nowotny | 136/111 |
| 3,004,094 | 10/1961 | Haessly | 136/111 X |
| 3,563,805 | 2/1971 | Deierhoi, Jr. | 136/111 |
| 3,617,387 | 11/1971 | Grulke et al. | 136/111 |
| 3,734,780 | 5/1973 | Bilhorn et al. | 136/111 |
| 3,770,504 | 11/1973 | Bergum et al. | 136/111 X |
| 3,784,414 | 1/1974 | Macaulay et al. | 136/111 X |

*Primary Examiner*—John H. Mack
*Assistant Examiner*—C. F. Lefevour
*Attorney, Agent, or Firm*—Esther A. H. Hopkins; Sheldon W. Rothstein

[57] ABSTRACT

A relatively thin, flat or planar battery is disclosed which includes one or more cells in series relationship each comprising a planar anode in superposed relationship with a planar cathode and a separator disposed intermediate and extending substantially coextensive the facing surfaces of the anode and cathode possessing marginal portions and an aqueous electrolyte permeable central portion. Each cell includes an aqueous electrolyte disposed in the central portion of the separator and in contact with the facing surfaces of both the anode and the cathode and an electrically nonconducting, water-vapor impervious, heat-activated thermosetting adhesive which is the product of the reaction between a thermally dissociated phenol-, alkyl or aryl thiol-, or 1,3-dicarbonyl compound-polyisocyanate or polyisothiocyanate adduct and a polymer containing active hydrogen atoms extending intermediate and providing adhesive contact between the marginal portions of the separator and next adjacent facing surfaces.

20 Claims, 2 Drawing Figures

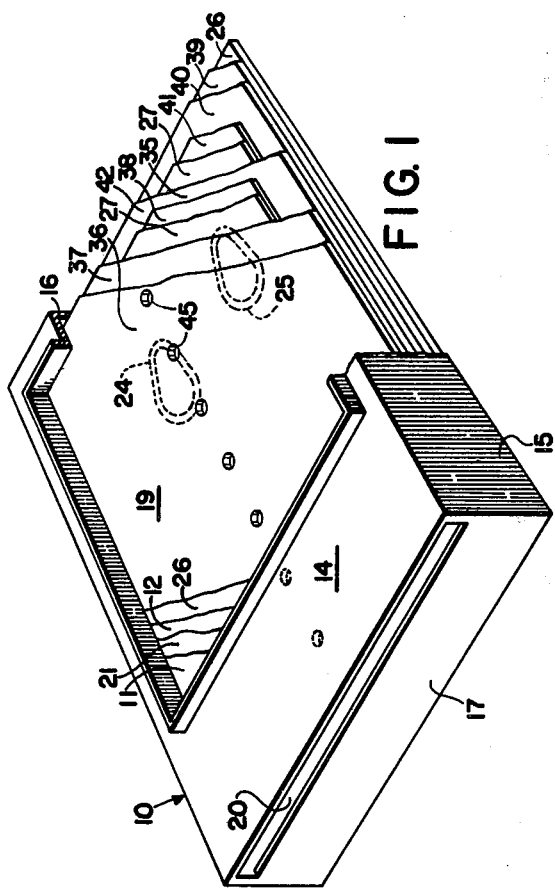

BATTERY ASSEMBLY

BACKGROUND OF THE INVENTION

The present invention is concerned with new and improved flat or planar batteries of the general type disclosed in U.S. Pat. Nos. 3,563,805; 3,617,387; 3,734,780; and the like.

As disclosed in the cited patents, in general such planar energy cells or batteries comprise superposed planar anode/cathode combinations possessing a separator disposed intermediate each anode and cathode and electrolyte disposed on or impregnated in the separator and in contact with respective facing surfaces of the anode and cathode.

Planar batteries of the type disclosed in the aforementioned U.S. Patents are generally intended to be employed as an individual power source for portable electrically operated devices wherein the selected device design parameters are optimized by the availability and employment of a planar battery exhibiting reliability with respect to its power delivery characteristics. Batteries of the type in question presently are employed commercially to operate the various electrically powered systems of the photographic camera sold by Polaroid Corporation, Cambridge, Massachusetts, U.S.A., under the trademark "SX-70". In such cameras, the battery, disposed as a component of a film pack for employment in and in combination with the camera, provides the electrical energy necessary to operate the camera's exposure control, film transport and photoflash systems, and accordingly, such battery is required to operate in a sequential series of power generating modes which may or may not be interrupted by more or less extended recovery and/or storage times and under which conditions to deliver the required series of high current pulses dictated by the photographic system design.

As disclosed in U.S. Pat. No. 3,543,662, and the like, such batteries may constitute a constituent component of a photographic film assembly which comprises a cassette configured to retain a predetermined number of film units for selective sequential photoexposure and a flat or planar battery for powering various photographic camera instrumentalities for photographic employment of the film units.

In present commercial employment, the planar batteries distributed comprise, in essence, primary batteries of the LeClanche type employing an aqueous electrolyte system which includes the conventional ionizable ammonium and/or zinc salt components of such type, e.g., ammonium and/or zinc chloride, and mercuric chloride present to inhibit the generation of hydrogen derived from electrolyte attack on LeClanche type zinc constituted battery anode materials.

In view of the critical necessity to maintain the various active layers and materials constituting a planar battery of the type set forth in the aforementioned U.S. patents, in intimate contiguous contact and to prevent electrolyte solvent loss during storage and employment, in order to reduce, to the extent possible, internal resistance within the cells constituting the battery, it is imperative that the adhesive seals effectively function to maintain the physical conformation and integrity of the battery preventing environmental attack on, or loss of, active components constituting the battery's electrochemical system.

U.S. Pat. No. 3,701,690 is directed toward a battery having sealant impregnated into a separator, and U.S. Pat. No. 3,708,349 is directed toward a method of constructing multicell batteries. Both generally disclose appropriate adhesive materials but neither patent teaches the instant invention as claimed hereinbelow.

SUMMARY OF THE INVENTION

The present invention is directed to a new and improved energy cell or battery which comprises one or more individual cells each of which include a planar anode superposed substantially coextensive a planar cathode and possessing a planar separator including an electrolyte permeable central portion surrounded by substantially electrolyte-free marginal portions positioned between the anode and cathode. Aqueous electrolyte is disposed in the central portion of the separator and in contact with opposed facing surfaces of both the anode and cathode and the battery specifically includes an electrically nonconducting, water-vapor impervious heat-activated thermosetting adhesive which is the product of the reaction between a thermally dissociated phenol-, alkyl or aryl thiol-, or 1,3-dicarbonyl compound- polyisocyanate or polyisothiocyanate adduct and a polymer containing active hydrogen atoms, hereinafter "adhesive system of the present invention," extending coextensive and intermediate marginal portions of the separator and next adjacent facing surfaces.

BRIEF DESCRIPTION OF THE DRAWINGS

FIG. 1 is a fragmentary perspective view of one embodiment of a photographic film assemblage in accordance with the present invention and including a cassette, photographic film units, spring biasing member, gas collector, and planar battery; and FIG. 2 is a diagrammatic enlarged cross-sectional view of a film assemblage of the type set forth in FIG. 1, along section line 2—2, illustrating the association of elements comprising the photographic film assemblage.

DETAILED DESCRIPTION OF THE INVENTION

As disclosed in previously mentioned U.S. Pat. No. 3,543,662, a film pack or cassette for photographic cameras may be configured to retain a number of film units for selective sequential exposure and a flat or planar battery assembly for powering various photographic camera instrumentalities for employment of the film units.

In accordance with the present invention, the preferred form of a battery assemblage of the present invention for employment in such film assemblage comprises one or more planar electrical energy cells, each cell in series relationship and including superposed planar anode and cathode elements having disposed between their facing surfaces a separator possessing an electrolyte permeable central portion or section surrounded by substantially electrolyte-free marginal portions. Aqueous electrolyte is disposed in the central section and in contact with the facing surfaces of both the anode and cathode, and the adhesive system of the present invention is disposed providing an aqueous electrolyte impermeable seal between the marginal portions of the separator and the next adjacent facing anode and cathode surfaces to prevent escape of the aqueous electrolyte from its spatial location within the electrical energy generating components of the cell.

Unlike other heat activated thermosetting adhesives, e.g., uncured epoxies containing latent catalysts or hardeners, the adhesive system of the present invention has a comparatively long (months) storage stability on the separator under ambient conditions. Even coating solutions of the system in appropriate solvents (e.g. ketones) are stable. This is due to the relative inertness of blocked polyisocyanated and blocked polyisothiocyanates in the absence of elevated temperatures. Coating solutions of latent epoxy systems have comparatively shorter pot lives and in many cases, complete solution gelation can be observed in a matter of hours depending upon the extent of the solvent interaction with the complex catalyst or the latent hardener. Also, latent epoxy coatings are susceptible to atmospheric moisture which hydrolyze the reactive epoxy groups and impair their adhesive properties.

Adhesives of the present invention have been found to gel during the short allowable time span (seconds) of a battery assembly operation. For example, a 90/10 mixture by weight of a high molecular weight polyhydroxy ether of approximately 0.35hydroxyl equivalents/100 g. and a suitably substituted phenol adduct of toluene diisocyanate in a 3 mil thick coating on the separator will gel in ~ 2–10seconds at a platen temperature of 300°–400° F. A platen pressure of 20 psi is sufficient to give an excellent bond to the polymeric current collector. Phenol-formaldehyde, urea-formaldehyde and melamine-formaldehyde thermosetting resins are much slower to gel in this temperature range, requiring significantly longer dwell times (minutes), and dwell times as long as 30 minutes at 400° F for developing optimum adhesive properties. If the heat source is removed, the curing reaction for these formaldehyde-based resins stops rather quickly. This is not the case with the adhesives systems of the present invention since a 2–10 second dwell time was surprisingly more than adequate. Upon removal of the heat source, the degree of crosslinking was observed to increase while the temperature of the adhesive joint was decreasing. Even a 24 hour "post-cure" at room temperature was found to be beneficial.

The reactive-hydrogen bearing polymers of this invention are medium to high molecular weight thermoplastic adhesives in their own right, but in combination with blocked polyisocyanates or blocked polyisothiocyanates, exhibit the proper balance of good wettability and melt viscosity during the heat sealing step. Many adhesives become overly fluid during the sealing step, and exudation occurs from the marginal areas, contaminating the electrolyte fluid. The adhesives of the present invention remain within the marginal areas of the separator. This eliminates the formation of "starved" bonds (potential leaks) and increases the insulating effectiveness of the adhesive by keeping the electrodes farther apart. The rapid gelation which occurs enhances the effectiveness since flow ceases completely.

In the normal production sequence, the cutting operation, which results in individual batteries, follows the heat sealing step in a matter of minutes, while the adhesive joints are still quite warm. The adhesive systems of the present invention have higher moduli than their un-crosslinked, thermoplastic components at the same temperatures and, as a consequence, cut cleaner. This minimizes the fraying of electrode ends which can result in shorting out, fires and decreased production yields.

Each battery is preferably designed to include specifically a planar anode and/or cathode next adjacent a surface of the battery which includes a planar conductive metal sheet; a gas permeable, water-vapor impermeable planar plastic sheet; and an electrochemically active anode or cathode material, and at least one of such conductive metal sheets most preferably includes one or more orifices extending through the metal sheet to conduct gas generated or liberated within the battery from its structure.

The gas permeable, water-vapor impermeable plastic sheet material is disposed intermediate, and in intimate contact with, the conductive metal sheet and next adjacent anode or cathode material, and itself comprises an electrically conductive sheet material underlying the orifices disposed in the metal sheet, most preferably extending coextensive the metal sheet and functioning as a battery collector element. It will also be recognized that the plastic sheet material may overlie the metal sheet orifices in which case it may optionally be constituted as electrically conductive or insulative at the option of the operator and that such construction will be most generally employed in battery structures wherein the metal sheet element itself comprises the active electrode material such as, for example, an active sheet zinc LeClanche anode possessing the gas ports denoted above.

As seen by reference to perspective FIG. 1 and cross-sectional FIG. 2, the cassette may comprise a generally parallelepiped container or box 10 for holding and enclosing a plurality of film units 11, gas collector means 12 and a planar battery assemblage 13. Container 10 is shown as comprising a forward wall 14, side walls 15, a trailing end wall 16, a leading end wall 17, and a rear wall 18 and may be formed of a resilient plastic material. Forward wall 14 is provided with a generally rectangular exposure aperture 19 for transmitting light for exposing film units 11 carried within container 10. Leading end wall 17 is provided with a generally rectangular slot or exit orifice to provide a passage 20 at the leading end of the container through which film units 11 carried by the container are adapted to be individually withdrawn. Container 10 may additionally be provided with a dark slide or cover sheet (not shown) of any suitable opaque material such as paper or plastic sheet material positioned between the forwardmost film unit 11 and aperture 19 to serve as a light seal and which may be removed through withdrawal slot 20 once container 10 is located in its operative position within a camera apparatus.

The stack arrangement within container 10 of a plurality of film units 11 (one is shown in FIG. 1 and two are shown in FIG. 2), gas collector 12 and planar battery assemblage 13 is specifically illustrated in FIG. 2. Each film unit 11 is arranged in overlying relationship with its exposure surface facing in the direction of exposure aperture 19.

As disclosed in aforementioned U.S. Pat. No. 3,543,662, the cassette additionally includes a spring-loaded platform 21 positioned between battery assemblage 13 and next adjacent film unit 11 for compressively retaining the battery terminals next adjacent cassette terminal ports 24 and 25 for interengagement with camera electrical leads, and for biasing film units 11 in the direction of exposure aperture 19.

The completed film cassette assemblage including film units 11, spring member 21, collector 12 and battery 13 shown in FIGS. 1 and 2 is adapted for direct employment in camera devices of the type previously mentioned and disclosed in detail in U.S. Pat. Nos. 3,643,565; 3,714,879.

As shown in FIGS. 1 and 2, battery 13 may include gas permeable envelope or container 26 retaining the superposed electrical energy generating components of the battery disposed within, for example, an electrically nonconducting water-vapor impervious thermoplastic envelope extending around and coextensive the external or exterior surfaces of the generating components. Envelope 26 acts to encapsulate the energy components to further prevent escape of aqueous electrolyte 27 and/or electrolyte solvent or vapor from its predetermined spatial location within battery 13's structure.

Electrical leads 28 and 29, respectively, extend from the interior of the battery and, specifically, individually from cathode or positive electrode 30 and from anode or negative electrode 31 of battery 13 for electrical interconnection with the intended device to be powered by the cell.

As seen by reference to FIGS. 1 and 2, the electrical energy generating components of battery 13 comprise, in essence, planar anode 31 in superposed relationship with planar cathode 30 having separator 32 disposed intermediate facing surfaces 33 and 34, respectively, of anode 31 and cathode 30, within the confines of envelope 26. Aqueous electrolyte 27 is disposed in the central portion 35 of separator 32 and in contact with each of facing surfaces 33 and 34.

In the preferred embodiment, the battery will ordinarily comprise a LeClanche electrochemical system including a zinc negative or anode system 31 and a manganese dioxide positive or cathode system 30. The aqueous electrolyte 27 will generally comprise an aqueous ammonium chloride, zinc chloride electrolyte and, in addition, a small amount of mercuric chloride which will be disposed between and in contact with the facing surface of each of the anode and the cathode and in contact and impregnated into electrolyte permeable central portion 35 of separator 27.

As shown in the figures, the preferred anode 31 may itself advantageously comprise, in combination, a composite structure including metallic sheet current collector plate 36 preferably an aluminum, lead or steel, e.g., tin plated steel, sheet material on the order of less than 10 mils in thickness possessing a plurality of gas ports or orifices 45 adapted to allow exit from the battery of gas generated or liberated within the energy cells; polymeric current collector 37 preferably a sheet of electrically conductive carbon impregnated water-vapor impermeable vinyl film sold under the trade designation "Condulon" possessing the same relative external dimensions as the anode and in the order of about 7 mils in thickness, and a distribution of active zinc negative material 38 either as a zinc paste carried on the conductive polymeric collector 37 or active sheet zinc secured to collector 37, in each instance amalgamated in the conventional manner, as for example, with mercury by contact with mercuric chloride.

The preferred cathode 30 may itself comprise a metallic sheet current collector plate 39 analogous in construction to collector 36; polymeric current collector 40 also analogous in construction to collector 37; and active positive material 41 as a cathodic paste deposition on collector 40, for example, the manganese dioxide/electrically conductive carbon mixture dispersed in a polymeric binder which is employed in the manner conventional in the battery art.

Electrolyte 27 will ordinarily comprise a conventional aqueous ammonium chloride/zinc chloride about 4:1 dispersed in a polymeric binder such as hydroxyethyl cellulose, polyacrylamide, etc., for example, on the order of about five or more percent applied to and impregnated in central portion 35 of separator 32 and in contact with the facing surfaces of active positive material 30 and active negative material 31. In addition, as previously mentioned, a small quantity of mercuric chloride will be present in the electrolyte as a corrosion inhibitor for the zinc anode system.

In general, marginal portions 42 of separator 32 will be maintained free of electrolyte 27 and may be coated on each surface with and impregnated by the adhesive system of the present invention adapted to secure the separator to the anode and cathode, respectively, for example, marginal sections 42 of separator 32 to the facing marginal sections of polymeric collectors 37 and 40.

Planar LeClanche type batteries presently in commercial production and distribution generally measure about 2¾ × 3⅜ inches in terms of their major dimensions and the marginal areas of such batteries will generally comprise about one-fourth of an inch. Accordingly, the chemical system which reacts on heating to form the adhesive system of this invention is coated on each marginal facing surface at a coverage of about 3 mils, and dried at 50° C for a few minutes to remove the solvent. The marginal facing surfaces are thermally sealed by pressure application of a heated die possessing the contact surface configuration of the marginal areas to be secured whereby a blocked polyisocyanate or polyisothiocyanate is unblocked and reacts with a polymer containing active hydrogen atoms to form a three-dimensional structure which no longer flows at 150° C.

Blocked polyisocyanates are compounds which contain no free isocyanate groups, but which, though relatively inert at room temperature, will react at elevated temperatures in a manner which is similar to that of free isocyanates. The formation of such compounds (adducts) is illustrated below:

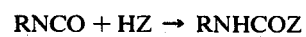

$$RNCO + HZ \rightarrow RNHCOZ$$

where HZ, the blocking agent comprises such compounds as phenols, thiols and 1,3-dicarbonyl compounds.

Polymers containing active hydrogen atoms which may be used in this invention are, for example, polyurethanes, polyamides, polyureas, suitably derivatized acrylics, polyhydroxy ethers, polyesters, polyamineamides, water insensitve organo soluble cellulosic derivatives, etc. Examples of compounds used in this invention which contain at least two —N=C=X groups wherein X is selected from the group consisting of oxygen and sulfur are toluene diisocyanate, polymethylene polyphenylisocyantes, methylene bis (4-phenyl isocyanate), para phenylene diisothiocyanate cyanate and the like.

In general, the adhesive system of the present invention may be applied to the marginal portions of the separator by any conventional coating technique adapted to effect selective deposition of the composition on a sheet material and may be coated from an organic solvent specifically selected for applying the specific adhesive system. Separator 32 may be readily constructed of and comprise a conventional battery separator material such as aqueous electrolyte permeable fibrous sheet materials, for example, microporous paper, kraft papers and polymeric sheet materials such as woven polyester sheet, etc.

As illustrated by the figures, the battery itself may comprise a multi-cell structure preferably arranged and constructed with the cells of the battery in superposed or stacked configuration and in electrical series relationship; the number of such cells determined by the power output of each cell and the power requirements of the device to be energized by the battery.

Intermediate each cell 43 there is located intercell connector 44 which in a preferred embodiment will comprise polymeric sheet material of the type described above with reference to current collectors 37 and 40 and upon opposed surfaces there may be secured the respective anode and cathode compositions of the opposed cells.

The capacity of each of the primary battery cells as described will vary substantially in proportion to the areas of their active surfaces. Typically, one such cell will produce about 0.10 to 0.15 amperes per square inch of surface area while yielding about 1.5 volts. For popular photographic camera sizes, an area within each film cassette available for retaining the batteries will provide about 10 to 12 square inches of practical surface. It follows, therefore, that the battery capacity desired for a film supply-power source combination readily may be varied through the simple expedient of combining a select number of discrete cells of predetermined dimension.

The number, positioning and size of the respective gas port or ports 45 employed under a predetermined set of circumstances will be that necessary to insure transit of generated gas from internal the battery and, with respect to the planar LeClanche type batteries commercially employed as detailed above and which generally measure in terms of their major dimensions about 2¾ × 3 ⅜ inches, a repetitive series of ports of holes 1/16 inch in diameter one-half inch on centers extending along the midline of the battery's long dimension have been found to be satisfactory with respect to such commercially distributed batteries.

As previously mentioned, where desired, the preferred composite anode denoted above may itself comprise, in essence, a sheet zinc anode, for example about 2 to 12 mils in thickness and surface amalgamated in the conventional manner. In such circumstances the sheet zinc stock may possess the gas port configuration discussed above and the gas permeable, water-vapor impermeable plastic sheet such as, for example, a polyvinyl chloride, polyethylene, and the like, may be disposed contiguous the external surface of the zinc electrode material and where required maintained in position by an suitable adhesive compatible with the battery structure.

While it is preferred to employ the aforementioned LeClanche electrochemical system (comprising manganese dioxide positive active material, zinc negative active material, and an electrolyte comprising ammonium chloride and zinc chloride), the battery may employ a wide variety of positive and negative electrode materials and a wide variety of electrochemical systems including both primary and secondary systems.

Film unit 11 may be advantageously constructed in accordance with the disclosure of any of U.S. Pat. Nos. 3,594,165; 3,689,262; 3,672,890; or the like.

Specifically preferred film units of the types disclosed in the last-mentioned U.S. patents comprise integral negative positive color diffusion transfer process film units which include, in combination, a photosensitive silver halide layer having associated therewith a diffusion transfer process dye image-forming material adapted to diffuse to a diffusion transfer process image-receiving layer as a function of the point-to-point degree of exposure and processing of the photosensitive silver halide layer; a diffusion transfer process image-receiving layer adapted to receive dye image-forming material diffusing thereto to provide dye transfer image formation, and an opaque layer disposed intermediate the photosensitive silver halide layer and the image-receiving layer against which the dye transfer image in the reception layer may be viewed subsequent to formation.

As disclosed in U.S. Pat. No. 3,672,890 a composite photosensitive structure, particularly adapted for reflection type photographic diffusion transfer color process employment, which comprises a plurality of essential layers including, in sequence, a dimensionally stable layer preferably opaque to incident radiation; one or more silver halide emulsion layers having associated therewith a diffusion transfer process dye image-providing material; a polymeric layer adapted to receive solubilized dye image-providing material diffusing thereto; and a dimensionally stable transparent layer, may be exposed to incident actinic radiation and processed by interposing, intermediate the silver halide emulsion layer and the reception layer, a processing composition and an opacifying agent, which may reflect incident radiation, in a quantity sufficient to mask dye image-providing material associated with the silver halide emulsion.

In a preferred embodiment, the composite photosensitive structure includes a rupturable container, retaining an alkaline processing composition and the opacifying agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition, distributed intermediate the reception layer and the silver halide emulsion, permeates the silver halide emulsion layers of the composite photosensitive structure to initiate development of the latent images contained therein resultant from photo-exposure. As a consequence of the development of the latent images, dye image-providing material associated with each of the respective silver halide emulsion layers is individually mobilized as a function of the point-to-point degree of the respective silver halide emulsion layer's photoexposure resulting in imagewise distributions of mobile dye image-providing materials adapted to transfer, by diffusion, to the reception layer to provide the desired transfer dye image. Subsequent to substantial dye image formation in the reception layer, means associated with composite structure are adapted to convert the pH of the film unit from a first processing pH at which dye image-providing material is diffusible as a function of the film unit's photoexposure to a second pH at which the transfer dye image exhibits increased stability, preferably a sufficient portion of the ions of an alkaline processing composition transfers, by diffusion, to a polymeric neutralizing layer to effect reduction in the alkalinity of the composite film unit from a first alkaline processing pH to the second pH at which dye image-providing material is substantially nondiffusible, and further dye image-providing material transfer is thereby substantially obviated.

The transfer dye image is viewed, as a reflection image, through the dimensionally stable transparent layer against the background provided by the opacifying agent, distributed as a component of the processing composition, intermediate the reception layer and next adjacent silver halide emulsion layer. The thus-formed opacifying stratum effectively masks residual dye image-providing material retained in association with the silver halide emulsion layer subsequent to processing.

In U.S. Pat. No. 3,415,644, the dimensionally stable layer of the film unit next adjacent the photosensitive layer or layers is disclosed to be opaque, the opacifying agent is initially disposed in an aqueous alkaline processing composition and the film unit's pH modulating means are disclosed to comprise a polymeric layer disposed intermediate the dimensionally stable transparent layer and the reception layer and adapted to reduce, subsequent to substantial dye transfer image formation, the pH of an aqueous alkaline processing composition from a first processing pH at which the dye image-forming material or materials are soluble and diffusible in the composition as a function of the photoexposure of the photosensitive silver halide layer associated therewith to a second pH at which the dye image-forming material or materials are substantially nondiffusible and, as disclosed in U.S. Pat. No. 3,415,646, the dimensionally stable layer of the film unit next adjacent the photosensitive silver halide layer or layers may be transparent to incident actinic radiation and, as further disclosed in U.S. Pat. No. 3,415,645, in such instance the opacifying agent may be initially disposed in the film unit intermediate the reception layer and next adjacent silver halide layer.

As disclosed in U.S. Pat. Nos. 3,615,421 and 3,661,585, the opacifying component of the film unit may optionally be initially disposed as a preformed processing composition permeable layer, intermediate the reception layer and next adjacent silver halide layer, in a concentration which prior to photoexposure is insufficient to prevent transmission therethrough of exposing actinic radiation and which, subsequent to processing, possesses an opacifying capacity effective to mask residual dye image-providing material retained associated with the film unit's silver halide emulsion layers, and in U.S. Pat. No. 3,647,435, the opacifying component of the film unit may optionally be initially formed in situ, intermediate the reception layer and next adjacent silver halide layer, during photographic processing of the film unit.

In U.S. Pat. No. 3,647,437, the opacifying component is disclosed to optionally comprise a light-absorbing reagent such as a dye which is present as an absorbing species at the first pH and which may be converted to a substantially non-absorbing species at the second pH, and in U.S. Pat. Nos. 3,473,925; 3,,573,042 and 3,576,626, opacifying and reflecting component, respectively, may be individually interposed intermediate the silver halide layer and reception layer by selective distribution from a composite or a plurality of rupturable containers.

In U.S. Pat. No. 3,573,043, the polymeric neutralizing layer is disclosed to be optionally disposed intermediate the dimensionally stable opaque layer and next adjacent essential layer, i.e., next adjacent silver halide/dye image-providing material component, to effect the designated modulation of film unit's environmental pH; U.S. Pat. No. 3,576,625 discloses the employment of particulate acid distributed within the film unit to effect the modulation of the environmental pH, and U.S. Pat. No. 3,573,044 discloses the employment of processing composition solvent vapor transmissive dimensionally stable layers to effect process modulation of dye transfer as a function of solvent concentration.

Where desired, the film unit may also be constructed in accordance with the disclosure of U.S. Pat. Nos. 3,594,164; 3,594,165; 3,689,262 and 3,701,656 to comprise a composite photosensitive structure including a transparent dimensionally stable layer carrying a reception layer, a processing composition permeable opaque layer and a photosensitive silver halide layer and the film unit may include a separate dimensionally stable sheet element adapted to be superposed on the surface of the photosensitive structure opposite the dimensionally stable layer and may further include means such as a rupturable container retaining processing composition for distribution of a processing composition intermediate the sheet and photosensitive structure to effect processing. As further disclosed in certain of the last-cited patents and applications, in structures wherein the receptor is positioned next adjacent the transparent layer or the processing composition and/or the sheet is to be separated from the remainder of the film unit subsequent to processing, the latter elements may optionally include opacifying component.

As disclosed in U.S Pat. No. 3,620,724, the dimensionally stable layer referred to may be opaque and in which instance the photosensitive silver halide layer is positioned next adjacent the opaque support layer and the opacifying component of the film unit's processing composition permeable opaque layer will be disposed in the unit in a concentration insufficient to prevent transmission therethrough of exposing actinic radiation and which, subsequent to processing, possesses an opacifying capacity effective to mask residual dye image-providing material retained associated with the silver halide layer, and as disclosed in U.S. Pat. No. 3,647,434, the opacifying agent may be optionally formed in such film unit, in situ, during processing of the unit.

As illustrated in FIGS. 1 and 2, a gas collector may be employed which may comprise a planar sheet structure or member 12 adapted to capture ammonia gas, water or mercury vapor or other volatile effluvia liberated or released from battery 13 by the evaporation and/or decomposition of electrolyte 27 to prevent photographically deleterious action of the effluvia on the photographic sensitometry of film units 11 disposed in cassette 10.

Collector 12 may itself readily comprise a metal salt adapted to form an ammoniate, i.e., an ammonia addition compound structurally analogous to a hydrate, upon contact with ammonia, preferably a transition metal salt adapted to form an ammoniate upon such contact and most preferably a transition metal salt the cation of which is Fe++, Ni++, Mn++ or Cu++. Although an anion of such salt may comprise any anion which does not interfer with the efficient and effective formation of the ammoniate, in general, simple anions readily available commercially as a component of the preferred salts may comprise $Cl^-$, $Br^-$, $I^-$ or $SO_4^=$.

Collector 12 may be constructed by disposition of the metal salt within a gas permeable and preferably adsorbent fibrous matrix such as blotting or filter paper, as, for example, by contacting or dipping such matrix with a solution of the metal salt which may be aqueous to impregnate the carrier matrix and removing the solvent. Where desired, the collector may also be constructed by coating an ammonia gas permeable and preferably adsorbent layer containing the salt on a dimensionally stable support, preferably a gas permeable and adsorbent support. Such coating may be accomplished employing any of the conventional coating or casting techniques available in the art and the coating composition may readily comprise a dispersion of the selected salt in a gas permeable polymeric matrix such as, for example, gelatin, polyvinyl alcohol, polyacrylamide, hydroxyethyl cellulose, or the like.

In a particularly preferred construction, the metal salt adapted to form an ammoniate upon contact with ammonia will be disposed in intimate admixture with the selected gas adsorbent matrix and most preferably in admixture, and particularly surface contact, with a dispersion of a gas adsorbent possessing maximum active surface area. Specifically preferred adsorbents will comprise a particulate dispersion of, for example, gas adsorbent carbon black, alumina, silica gel, and the like and particularly those gas adsorbents which possess a high water vapor adsorption or absorption capacity and efficiency per unit weight and extensive active surface area.

In general, the concentration of salt and/or adsorber employed will be that necessary to insure collection and capture of the maximum amount of ammonia, water and mercury vapor, and other effluvia theoretically capable of liberation from the battery employed in the specific construction of the film assembly design selected.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A planar battery which comprises, in combination and in superposed relationship, electrical energy generating components including:
   a. a planar anode;
   b. a planar cathode superposed substantially coextensive the anode;
   c. a planar separator positioned intermediate and extending substantially coextensive the facing surfaces of the anode and the cathode including marginal portions and an aqueous electrolyte permeable central portion;
   d. an aqueous electrolyte disposed in the central portion of the separator and in contact with the facing surfaces of the anode and the cathode; and
   e. an electrically nonconducting, water vapor impervious heat-activated thermosetting adhesive extending coextensive the marginal surfaces of the separator and securing the separator to the contiguous facing surfaces of the anode and the cathode, said adhesive being the product of the reaction between a polymer containing active hydrogen atoms and a thermally dissociated adduct of a compound containing at least two –N=C=X groups wherein X is selected from the group consisting of oxygen and sulfur and the adduct is based on a compound selected from the group consisting of phenols, alkyl and aryl thiols and 1,3-dicarbonyl compounds.

2. A planar battery as defined in claim 1 wherein the anode comprises zinc.

3. A planar battery as defined in claim 2 wherein the zinc is secured to the surface of an electrically conductive, gas permeable and water-vapor impermeable polymeric sheet positioned distal the separator.

4. A planar battery as defined in claim 3 wherein the conductive metallic sheet is secured to the surface of the conductive polymeric sheet opposite the zinc.

5. A planar battery as defined in claim 4 wherein the conductive metallic sheet comprises steel.

6. A planar battery as defined in claim 2 wherein the cathode comprises carbon.

7. A planar battery as defined in claim 6 wherein the cathode includes manganese dioxide.

8. A planar battery as defined in claim 7 wherein the carbon and manganese dioxide are disposed in an electrically conductive ionically permeable polymeric matrix.

9. A planar battery as defined in claim 8 wherein the carbon/manganese dioxide mixture is secured to the surface of a conductive carbon retaining polymeric sheet positioned distal the separator.

10. A planar battery as defined in claim 9 wherein a conductive metallic sheet is secured to the surface of the exterior conductive carbon retaining sheet opposite the carbon/manganese mixture.

11. A planar battery as defined in claim 6 wherein the electrolyte comprises zinc chloride and/or ammonium chloride.

12. A planar battery as defined in claim 11 wherein the electrolyte is disposed in an ionically permeable polymeric matrix.

13. A planar battery as defined in claim 12 wherein the separator comprises electrolyte permeable fibrous sheet.

14. A planar battery as defined in claim 1 wherein the marginal portions of the separator comprise electrolyte permeable separator sheet impregnated with said electrically nonconductive, water-vapor impermeable heat-activated thermosetting adhesive in a concentration effective to prevent electrolyte permeation of the marginal portions of the separator sheet.

15. A planar battery as defined in claim 1 wherein said thermally dissociated adduct is the phenol derivative of toluene diisocyanate.

16. A planar battery as defined in claim 1 wherein said polymer containing active hydrogen atoms is selected from a group consisting of polyurethanes, suitably derivatized acrylics, poly-hydroxy ethers, polyesters, polyamides, polyureas, polyamineamides, and water insensitive organo soluble cellulosic derivatives.

17. A planar battery as defined in claim 1 wherein said polymer containing active hydrogen atoms is a bisphenol A type polyhydroxyether.

18. A planar battery comprising a plurality of cells as defined in claim 1 in stacked and series relationship, each cell comprising, in combination:
 a. a planar anode;
 b. a planar cathode superposed substantially coextensive the anode;
 c. a planar separator including marginal portions and an aqueous electrolyte permeable central portion positioned intermediate and extending substantially coextensive the facing surfaces of the anode and the cathode;
 d. aqueous electrolyte disposed in the central portion of the separator and in contact with the facing surfaces of the anode and the cathode;
 e. an electrolyte impermeable electrically conducting intercell connector positioned intermediate and in coextensive contact with the facing surfaces of each superposed cell; and
 f. an electrically nonconducting, water-vapor impermeable heat-activated thermosetting polymeric adhesive extending coextensive the marginal surfaces of each separator and securing the marginal portions of the separators and each next adjacent facing surface, which adhesive is the product of the reaction between a polymer containing active hydrogen atoms, and a thermally dissociated adduct of a compound containing at least two —N=C=X groups wherein X is selected from the group consisting of oxygen and sulfur and the adduct is based on a compound selected from the group consisting of phenols, alkyl and aryl thiols and 1,3-dicarbonyl compounds.

19. A planar battery as defined in claim 18 wherein the intercell connector comprises an electrolyte impermeable electrically conducting polymeric sheet material.

20. A planar battery as defined in claim 19 wherein the anode of the first of two superposed cells is adhesively secured to one surface of the intercell connector and the cathode of the second of the superposed cells is adhesively secured to the opposite surface of the connector.

* * * * *